United States Patent
Fries et al.

(10) Patent No.: US 9,286,182 B2
(45) Date of Patent: Mar. 15, 2016

(54) VIRTUAL MACHINE SNAPSHOTTING AND ANALYSIS

(75) Inventors: Robert Fries, Kirkland, WA (US);
Galen Hunt, Bellevue, WA (US);
Shobana Balakrishnan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 13/163,582

(22) Filed: Jun. 17, 2011

(65) Prior Publication Data
US 2012/0323853 A1 Dec. 20, 2012

(51) Int. Cl.
*G06F 17/30* (2006.01)
*G06F 11/30* (2006.01)

(52) U.S. Cl.
CPC .......... *G06F 11/301* (2013.01); *G06F 11/3072* (2013.01); *G06F 2201/815* (2013.01); *G06F 2201/865* (2013.01)

(58) Field of Classification Search
CPC ............ G06F 11/301; G06F 2201/815; G06F 11/3072
USPC .................................... 706/15, 16, 20, 21, 46
See application file for complete search history.

(56) References Cited

U.S. PATENT DOCUMENTS

| | | | |
|---|---|---|---|
| 7,542,959 B2 * | 6/2009 | Barnhill et al. | 706/48 |
| 8,095,662 B1 * | 1/2012 | Lappas et al. | 709/226 |
| 8,135,994 B2 * | 3/2012 | Keromytis et al. | 714/38.11 |
| 8,296,759 B1 * | 10/2012 | Hutchins et al. | 718/1 |
| 2002/0087290 A1 * | 7/2002 | Wegerich et al. | 702/182 |
| 2006/0085784 A1 * | 4/2006 | Traut et al. | 718/1 |
| 2007/0074208 A1 | 3/2007 | Ling et al. | |
| 2007/0180439 A1 | 8/2007 | Sundararajan et al. | |
| 2007/0244938 A1 | 10/2007 | Michael | |
| 2007/0283192 A1 * | 12/2007 | Shevchenko | 714/39 |
| 2008/0016572 A1 * | 1/2008 | Burkhardt et al. | 726/24 |
| 2008/0022032 A1 * | 1/2008 | Nicholas et al. | 711/100 |
| 2008/0155169 A1 * | 6/2008 | Hiltgen et al. | 711/6 |
| 2008/0256533 A1 | 10/2008 | Ben-Yehuda et al. | |

(Continued)

FOREIGN PATENT DOCUMENTS

| | | |
|---|---|---|
| TW | 200925995 A | 6/2009 |
| TW | 201027431 A | 7/2010 |
| WO | 2013/003005 A2 | 1/2013 |

OTHER PUBLICATIONS

Virtual Machine Snapshots with Hyper-V Author: Robert Larson Date Published: Apr. 26, 2008.

(Continued)

*Primary Examiner* — Leslie Wong
(74) *Attorney, Agent, or Firm* — Kate Drakos; Henry Gabryjelski; Micky Minhas (57) ABSTRACT

Described are techniques for capturing and analyzing snapshots of virtual machines. One or more computers may automatically obtain snapshots of virtual machines as they are executing to form a pool of virtual machine snapshots. The virtual machine snapshots are then read to obtain a set of features properties of the virtual machine snapshots, including information about a running guest operating system, software installed on the virtual machine, metadata about the virtual machine itself, and others. The features or properties are analyzed, in one embodiment using a machine learning algorithm, to automatically compute and store information about the virtual machines.

19 Claims, 12 Drawing Sheets

(56) References Cited

U.S. PATENT DOCUMENTS

| | | | |
|---|---|---|---|
| 2008/0262991 A1* | 10/2008 | Kapoor et al. | 706/20 |
| 2009/0007100 A1 | 1/2009 | Field | |
| 2009/0043812 A1* | 2/2009 | Rigdon | 707/104.1 |
| 2009/0070771 A1* | 3/2009 | Yuyitung et al. | 718/105 |
| 2009/0089078 A1* | 4/2009 | Bursey | 705/1 |
| 2009/0276771 A1* | 11/2009 | Nickolov et al. | 717/177 |
| 2009/0300076 A1* | 12/2009 | Friedman et al. | 707/203 |
| 2009/0320010 A1 | 12/2009 | Chow et al. | |
| 2010/0049930 A1 | 2/2010 | Pershin et al. | |
| 2010/0070725 A1 | 3/2010 | Prahlad et al. | |
| 2010/0107158 A1 | 4/2010 | Chen | |
| 2010/0180092 A1 | 7/2010 | Rajaa | |
| 2010/0251004 A1 | 9/2010 | Schuba | |
| 2010/0293144 A1 | 11/2010 | Bonnet | |
| 2010/0299309 A1* | 11/2010 | Maki et al. | 707/640 |
| 2011/0022812 A1* | 1/2011 | van der Linden et al. | 711/163 |
| 2011/0047545 A1* | 2/2011 | Ellison et al. | 718/1 |
| 2011/0113206 A1 | 5/2011 | Heim | |
| 2011/0138366 A1* | 6/2011 | Wintergerst et al. | 717/130 |
| 2011/0265182 A1* | 10/2011 | Peinado et al. | 726/24 |
| 2011/0269111 A1* | 11/2011 | Elesseily et al. | 434/362 |
| 2012/0054554 A1* | 3/2012 | Dagan | 714/39 |
| 2012/0072968 A1* | 3/2012 | Wysopal et al. | 726/1 |
| 2012/0084262 A1* | 4/2012 | Dwarampudi et al. | 707/667 |
| 2012/0096158 A1* | 4/2012 | Astete et al. | 709/225 |
| 2012/0131480 A1* | 5/2012 | Kalmbach et al. | 715/763 |
| 2012/0137367 A1* | 5/2012 | Dupont et al. | 726/25 |
| 2012/0167094 A1* | 6/2012 | Suit | 718/100 |
| 2012/0233331 A1* | 9/2012 | Voccio et al. | 709/226 |
| 2012/0233610 A1* | 9/2012 | Mandre | 718/1 |
| 2012/0324236 A1* | 12/2012 | Srivastava et al. | 713/189 |
| 2013/0014259 A1* | 1/2013 | Gribble et al. | 726/24 |
| 2013/0311824 A1* | 11/2013 | Ji et al. | 714/15 |
| 2014/0075440 A1* | 3/2014 | Prahlad et al. | 718/1 |

OTHER PUBLICATIONS

Using vmrun to Control Virtual Machines Date Published: Dec. 7, 2010.

"Search Report Received for European Patent Application No. 12800885.1", Mailed Date : Oct. 22, 2014, 7 Pages.

Zhang, et al., "Learning-Aided Predictor Integration for System Performance Prediction", In Cluster Computing, vol. 10, Issue 4, Oct. 2, 2007, pp. 425-442.

"International Search Report", Mailed Date: Jan. 31, 2013, Application No. PCT/US2012/040958, Filed Date: Jun. 5, 2012, Pages 8.

"Office Action and Search Report Issued in Taiwan Patent Application No. 101113805", Mailed Date: Nov. 11, 2015, 9 Pages.

\* cited by examiner

RELATED ART

| snapshot | feature | value |
|---|---|---|
| #1 | featureA | valueX |
| #1 | featureB | valueY |
| #1 | featureC | valueX |
| #2 | featureA | valueQ |
| ... | | |
| #N | feature-f | value-V |

252B featureA

| snapshot | value |
|---|---|
| #1 | valueX |
| #2 | valueQ |
| ... | | featureB

| snapshot | value |
|---|---|
| #1 | valueY |
| #2 | valueS |
| ... | |

252C (VM#, datetime, guestOS, is-running-process-X, patch-level, etc.) 272

270 (1, 1/1/2011:12:13:55, "someOS", Yes, 4.1, ... )
(2, 3/2/2011:04:22:33, "anotherOS", No, 3.0, ...)

VIRTUAL MACHINE SNAPSHOTTING AND ANALYSIS

BACKGROUND

Modern computing continues to have areas where improvement is desired. The continuing evolution of how computers are designed and programmed at both the intra-machine and inter-machine level leads to new issues of performance, security, reliability, power consumption, efficiency, and so forth. Increasing complexity can make it difficult to identify bugs or critical aspects of machines or software. It has been known to analyze groups of static computers (e.g., static files of dormant machines) to learn about individual machines as well as groups of machines. Physical computers (physical machines) have been automatically analyzed to identify features in common among failing or well-performing machines, programmatic bugs, machines that are performing poorly or are experiencing errors, and so forth. However, to date, such analysis has been limited to the static state of physical machines, log files, disk images, and the like. It has not been possible to analyze, as a body, large groups of running computers.

Recently, however, in some environments such as compute clouds, data centers, etc., operating systems and software thereon are sometimes run on virtual machines (VMs), which are described in detail below. With virtual machine technology, it is possible to capture and store a snapshot of a running "machine", including hardware state of the machine, software state, operating system state, file system state, memory state, and so forth. This captured state of a machine "in motion" holds information that has not previously been considered as a collective set of data that may be subject to analysis.

Techniques related to analysis of sets virtual machine snapshots are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described are techniques for capturing and analyzing snapshots of virtual machines. One or more computers may automatically obtain snapshots of virtual machines as they are executing to form a pool of virtual machine snapshots. The virtual machine snapshots are then read to obtain a set of features properties of the virtual machine snapshots, including information about a running guest operating system, software installed on the virtual machine, metadata about the virtual machine itself, and others. The features or properties are analyzed, in one embodiment using a machine learning algorithm, to automatically compute and store information about the virtual machines.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Machine Virtualization

Figure 1:
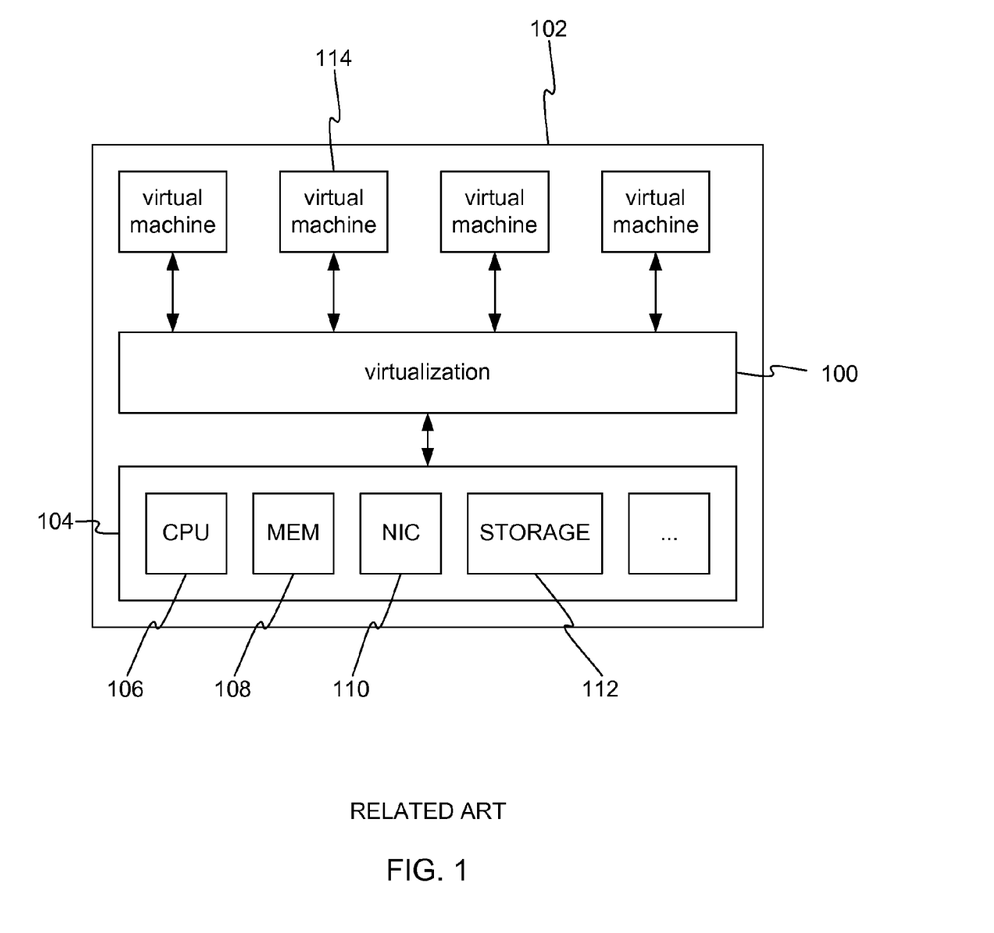
FIG. 1 shows, in related art, an example virtualization layer.

FIG. 1 shows an example virtualization layer 100. A computer 102 has hardware 104, including a central processing unit (CPU) 106, memory 108, a network interface 110, non-volatile storage 112, and other components not shown, such as a bus, a display adapter, etc. The virtualization layer 100 manages and facilitates execution of virtual machines 114. Although not shown in FIG. 1, each virtual machine 114 typically has an associated virtual disk image and a guest operating system. For brevity, the operating system and perhaps application software of a virtual machine 114 will sometimes be referred to as a guest, which is stored and executed from the virtual disk image associated with the virtual machine 114.

The virtualization layer 100 may be of any variety of known or future implementations, such as Hyper-V Server™, VMWare ESX Server™, Xen, Oracle VM™, etc. The architecture of the virtualization layer may a hosted type, with a virtual machine monitor (VMM) running on a host operating system, or a bare-metal type with a hypervisor or the like running directly on the hardware 104 of the computer 102. As used herein, the term "virtual machine" refers to a system-type virtual machine that simulates any specific hardware architecture (e.g., x86) able to run native code for that hardware architecture; to the guest, the virtual machine may be nearly indistinguishable from a hardware machine. Virtual machines discussed herein are not abstract or process-type virtual machines such as Java Virtual Machines.

The virtualization layer 100 performs the basic function of managing the virtual machines 114 and sharing of the hardware 104 by both itself and the virtual machines 114. Any of a variety of techniques may be used to isolate the virtual machines 114 from the hardware 104. In one embodiment, the virtualization layer may provide different isolated environments (i.e., partitions or domains) which correspond to virtual machines 114. Some of the virtualization layer 100 such as shared virtual device drivers, inter virtual machine communication facilities, and virtual machine management APIs (application programming interfaces), may run in a special privileged partition or domain, allowing for a compact and efficient hypervisor. In other embodiments, functionality for virtual machine management and coherent sharing of the hardware 104 may reside in a monolithic on-the-metal hypervisor.

Figure 2:
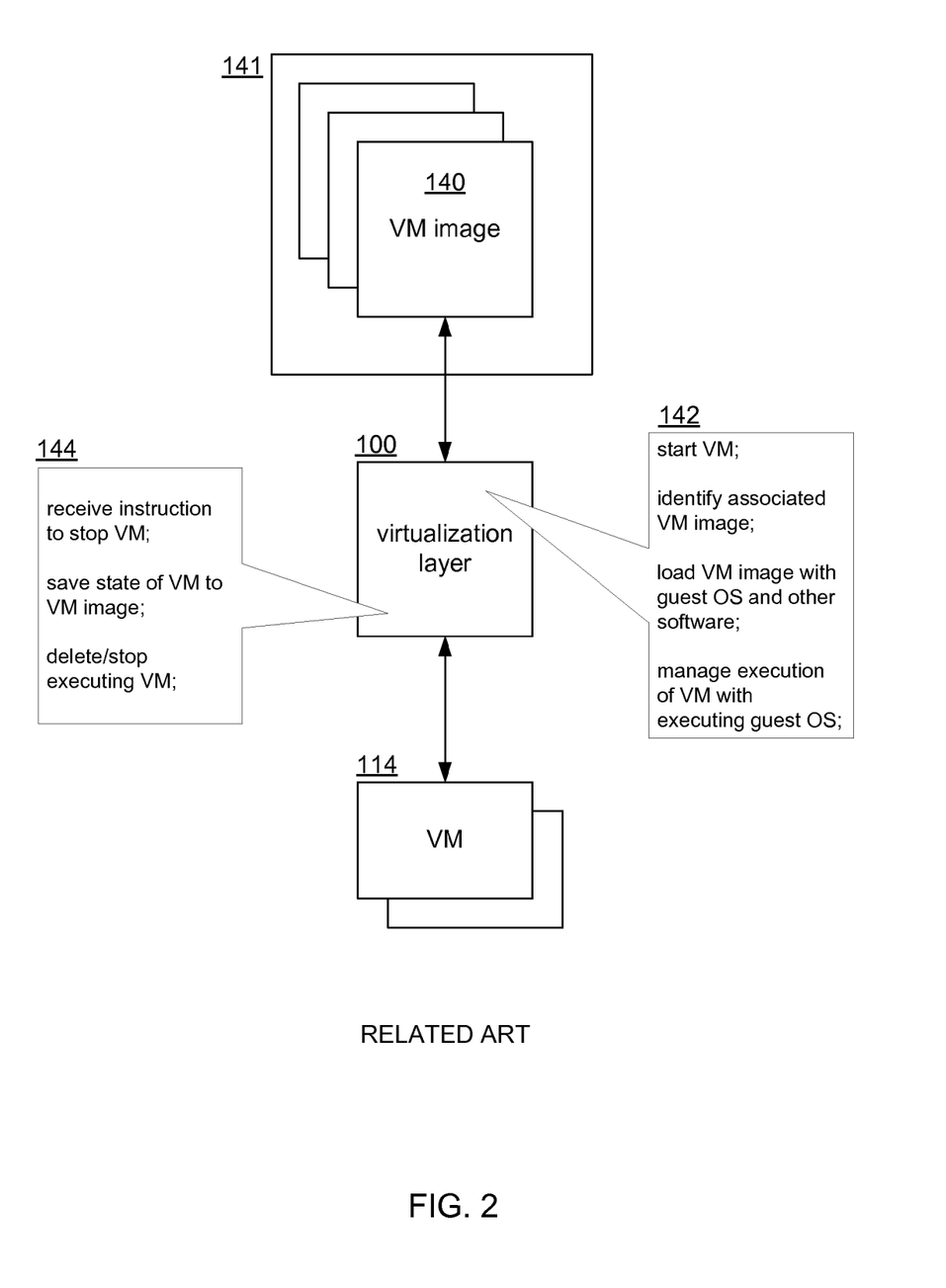
FIG. 2 shows, in related art, processes and interactions of virtualization layer in relation to virtual machines and virtual machine images.

FIG. 2 shows processes and interactions of virtualization layer 100 in relation to virtual machines 114 and virtual machine images 140. The virtualization layer 100 performs a process 142 of starting and executing a virtual machine 114, possibly according to corresponding virtual machine configuration parameters. When a virtual machine 114 (VM) is started, the virtualization layer identifies an associated virtual machine image 140. In practice, any virtual machine image 140 can be used by any virtual machine 114. The virtual machine image 140 may be a specially formatted file (e.g., a VHD) on a file system 141 of the virtualization layer 100. The virtualization layer 100 loads the identified virtual machine image 140. The started virtual machine 114 mounts and reads the virtual machine image 140, perhaps seeking a master boot record or other boot information, and boots a guest operating system which begins executing.

The virtualization layer 100 manages execution of the virtual machine 114, handling certain calls to the guest's kernel, hypercalls, etc., and coordinating the virtual machine 114's access to the underlying hardware 104. As the guest and its software run, the virtualization layer 100 may maintain state of the guest on the virtual disk image 140; when the guest, or an application run by the guest, writes data to "disk", the virtualization layer 100 translates the data to the format of the virtual disk image 140 and writes to the image.

The virtualization layer 100 may perform a process 144 for shutting down the virtual machine 114. When an instruction is received to stop the virtual machine 114, the state of the virtual machine 114 and its guest is saved to the virtual disk image 140, and the executing virtual machine 114 process (or partition) is deleted. A specification of the virtual machine 114 may remain for a later restart of the virtual machine 114.

Virtual Machine Shapshotting

Figure 3:
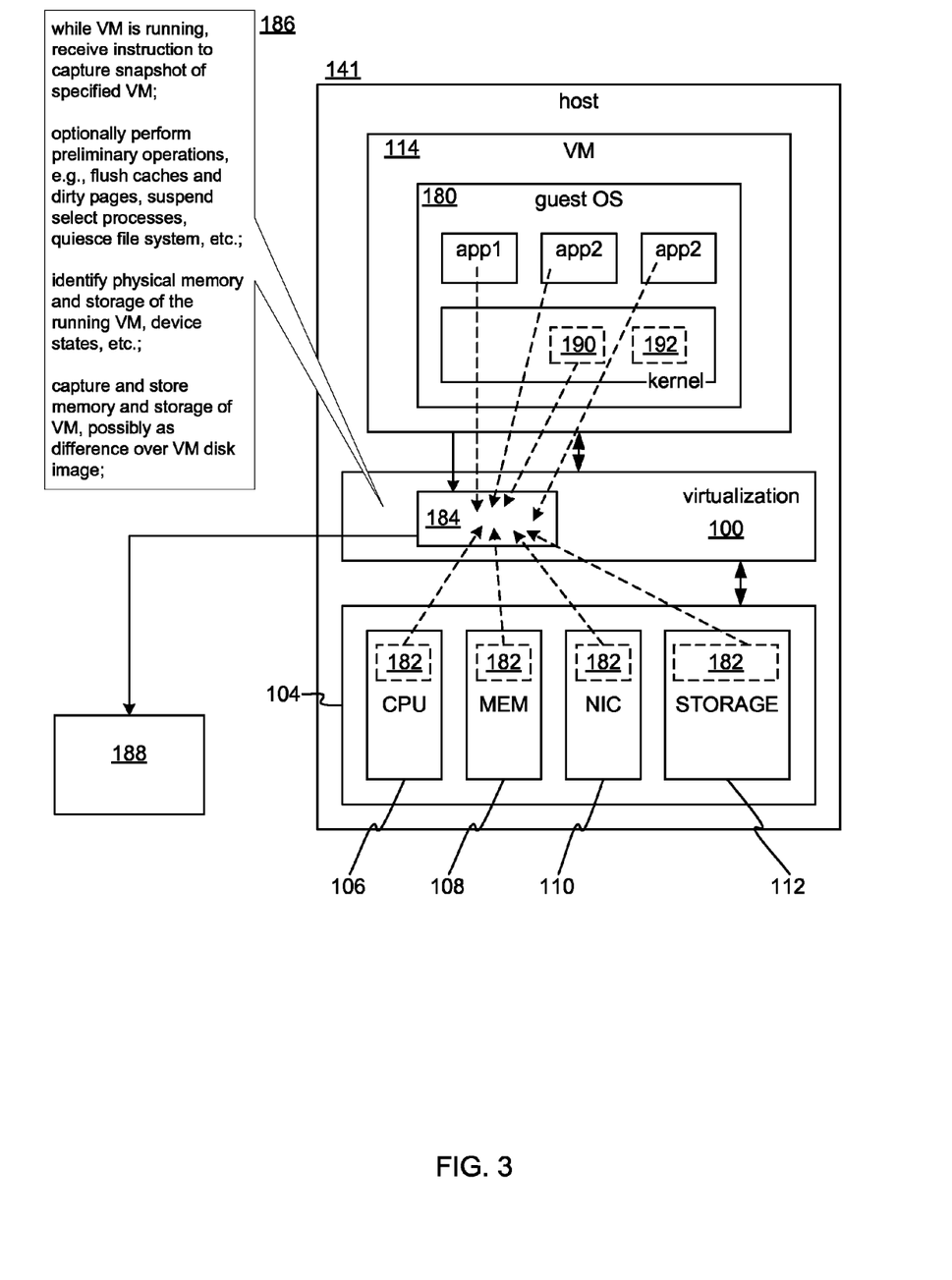
FIG. 3 shows how a snapshot of an executing virtual machine may be captured.

FIG. 3 shows how a snapshot of an executing virtual machine 114 may be captured. The virtual machine 114 has a guest operating system 180 executing thereon using the hardware 104. The running virtual machine 113 provides virtual disk storage that stores the guest operating system 180 and any applications or other software installed thereon. In sum state 182 of the guest 180 and applications may physically exist throughout the hardware 104, as managed by the virtualization layer 100. In sum, nearly any known hardware or software feature of a physical machine may have an equivalent on the virtual machine 114. The virtualization layer 100 includes a snapshotting component 184 that performs a process 186 to capture a snapshot 188. While the virtual machine 114 is running, and instruction is received to capture a snapshot of the virtual machine 114. For example, a virtualization management system may transmit an instruction across a network that is received by the virtualization layer 100. In some virtualization implementations, before a snapshot is captured, some preliminary preparation may be required. For example caches may require flushing, a file system or storage system may need to be quiesced, memory pages of the guest operating system 180 may need to be stored, and so forth.

Capturing a snapshot 188 may be performed with known techniques or with existing implementations of virtualization technology. Notably, snapshot 188 may include any information available in an equivalent running physical machine. For example, snapshot 188 may include a copy of the memory of the virtual machine 113, which may include executing processes 190, kernel data structures 192, or any information in the virtualized physical memory of the virtual machine 113. In addition, the snapshot 188 may include information captured from physical or virtual devices used by the virtual machine 113, including register values, buffer contents, etc. In some implementations, the snapshotting process 186 may also capture information about the virtual physical environment of the virtual machine 113, such as virtual CPU information (number of virtual cores or CPUs), amounts of memory and storage, virtual devices, virtual network interface cards, BIOS, virtual mother board, device drivers, and others. Some virtualization implementations may link a snapshot to the virtual machine's disk image, and the snapshot may comprise storage blocks of the executing virtual machine that differ from the virtual machine's disk image. In sum, snapshot 188 is a persistent object such as a file that contains the captured working state of a virtual machine. Most virtualization implementations allow a snapshot to be loaded and executed; the virtual machine executing the snapshot (possible a virtual machine other than the original from which the snapshot was captured) begins executing as though the original virtual machine at the time the snapshot was taken. In other words, the state of an executing virtual machine may be captured and later resumed in the same or a new virtual machine.

Figure 4:
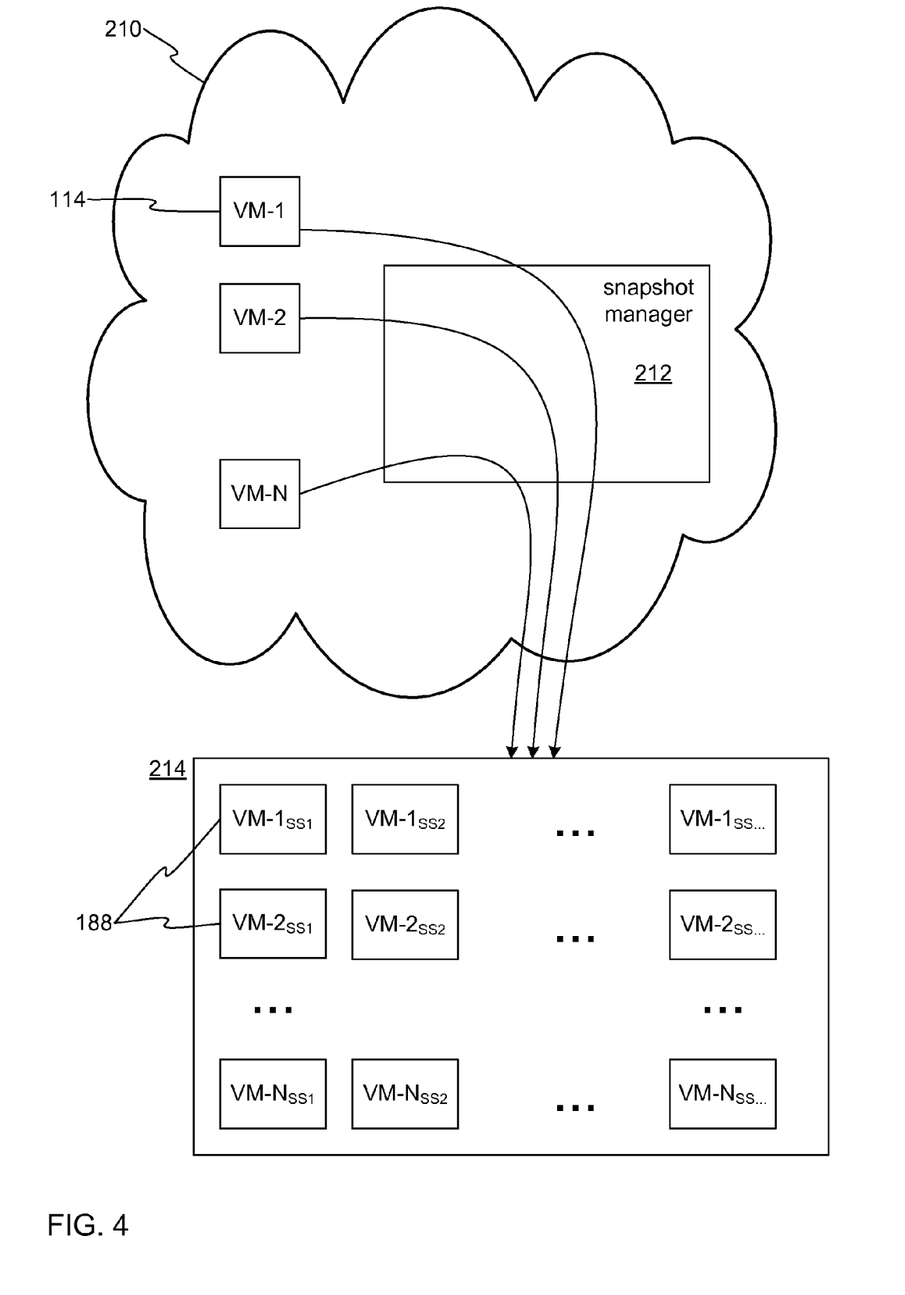
FIG. 4 shows a system for capturing virtual machine snapshots.

FIG. 4 shows a system for capturing virtual machine snapshots. Different virtual machines 114 are executed in a network 210, data center, compute cloud, or the like. A snapshot manager 212 triggers snapshot captures of the virtual machines 114, for example by sending messages via network 210 to the hosts running the virtual machines 114. The snapshotting components 184 respond by capturing snapshots 188, which may be stored in a snapshot repository 214, including information about the source virtual machine and the time of capture.

The snapshot manager 212 may be part of a virtual machine management system that manages virtual machines across a network. In one embodiment, snapshots 188 are repeatedly taken over time for any given virtual machine, possibly forming a chain of sequential snapshots for a virtual machine. For example, in FIG. 4, VM-1 has snapshot SS1, SS2, and others, captured at different points in time. VM-1 can be restarted at any time from one of its snapshots. For example, after SS2 is captured, SS1 could be loaded into VM-1 and VM-1 would be running in nearly the same state it had when SS1 was captured. This can allow a tree or hierarchy of versions of instances a virtual machine to be captured.

Figure 5:
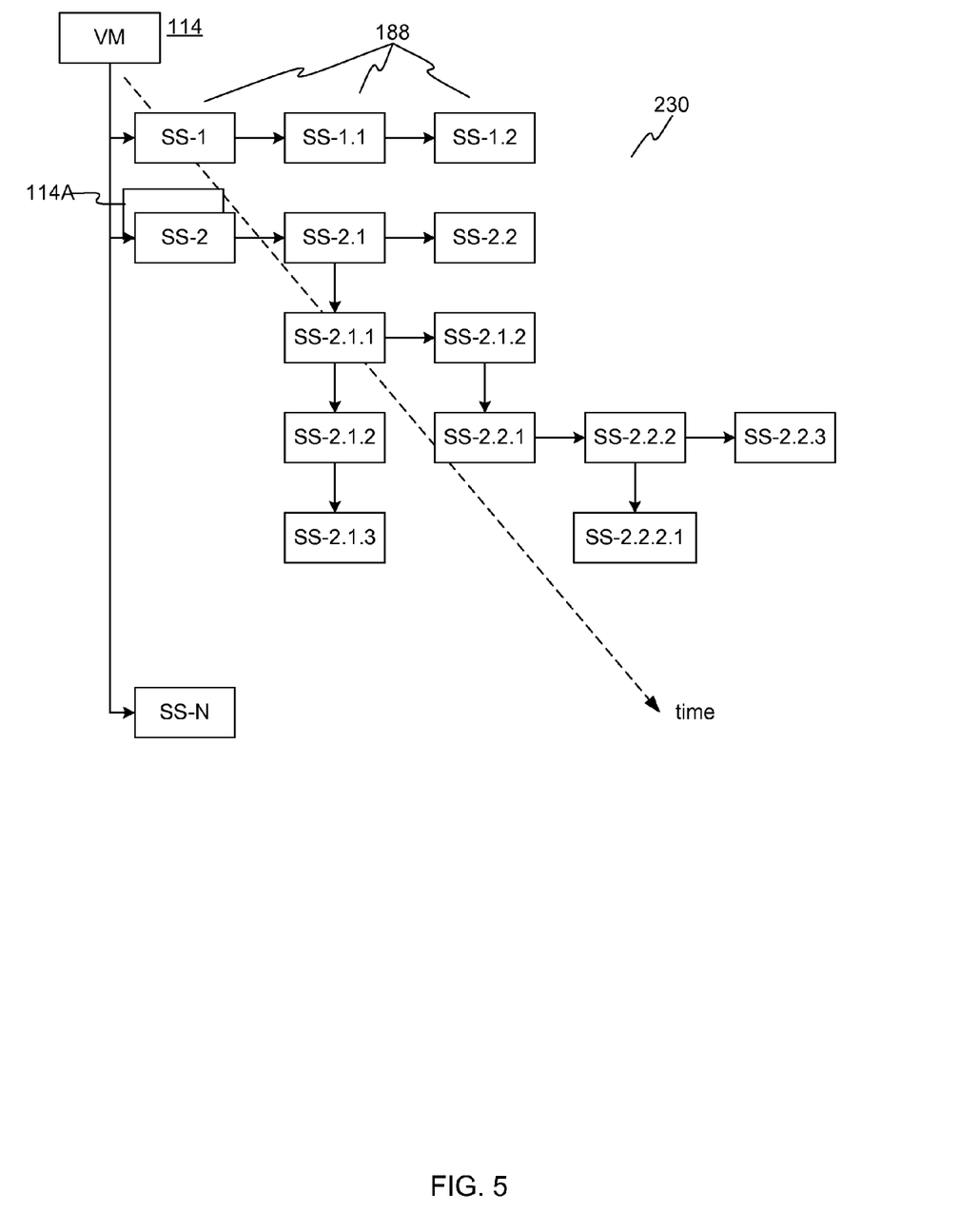
FIG. 5 shows a hierarchy of virtual machine snapshots.

FIG. 5 shows a hierarchy 230 of virtual machine snapshots. As mentioned above, it is possible to snapshot a virtual machine and then start the same or another virtual machine instance from that snapshot. This allows for diverging chains of snapshots to be obtained from a same base virtual machine. In FIG. 5, virtual machine 114 has a snapshot SS-1 taken at some point in time. Snapshot SS-2 is taken at a same or later time. A new virtual machine 114A may begin executing snapshot SS-2, and later snapshots of the virtual machine 114A are taken, such as SS-2.1, then SS-2.2, etc. Similarly, snapshot SS-2.1 may be started in yet another new virtual machine and snapshots SS-2.1.1, SS.2.1.2, . . . may be taken of that virtual machine. Over time the hierarchy 230 is formed, possibly with each virtual machine instance having its own virtual machine disk image to which it is linked, and snapshots from a same virtual machine each linked to its predecessor. It will be appreciated that in some cases a hierarchy may be a simple sequence of captures from a single virtual machine (e.g., SS-1, SS1.1, SS-1.2), or single snapshots of respective single instances of a same base virtual machine (e.g., SS-1, SS-2, . . . SS-N).

Figure 6:
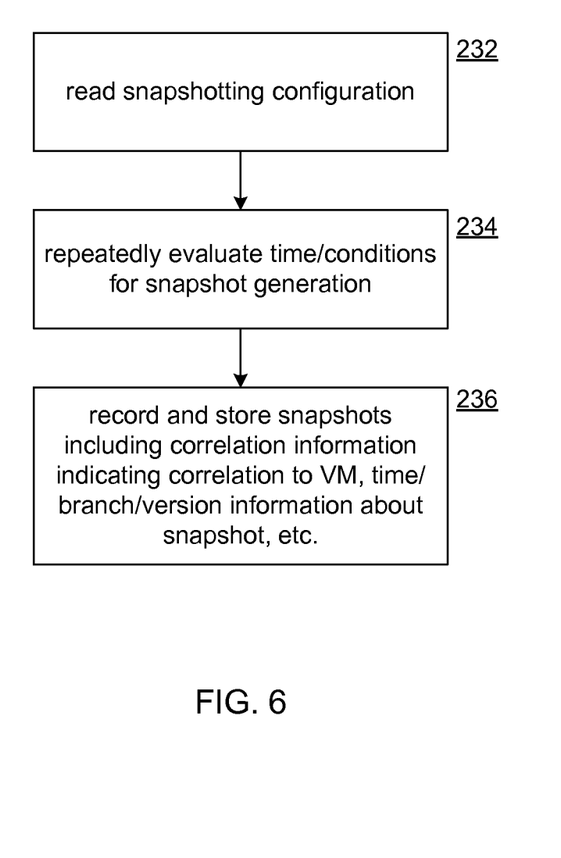
FIG. 6 shows a process for capturing virtual machine snapshots.

FIG. 6 shows a process for capturing virtual machine snapshots. At step 232 a snapshotting configuration file is read.

The configuration specifies implementation details such as where to store snapshots or how often to purge old snapshots. The configuration may also specify patterns for snapshot capturing, for example, frequency of capturing, when or under what conditions (e.g., after 5 preceding snapshots) to fork a new VM and snapshot branch, conditions for capturing a snapshot (e.g., a signal of current high network saturation), etc. In one embodiment, a captured snapshot may be associated or labeled with a topic or condition for which it is deemed possibly relevant, which may facilitate building a training set. At step 234 the configuration is repeatedly evaluated to determine if a snapshot condition exists. At step 236, snapshots are captured when so determined at step 234. Metadata about the snapshotting process may be captured, and, as mentioned, labels or the like may be associated with a snapshot.

Virtual Machine Snapshot Analysis

Figure 7:
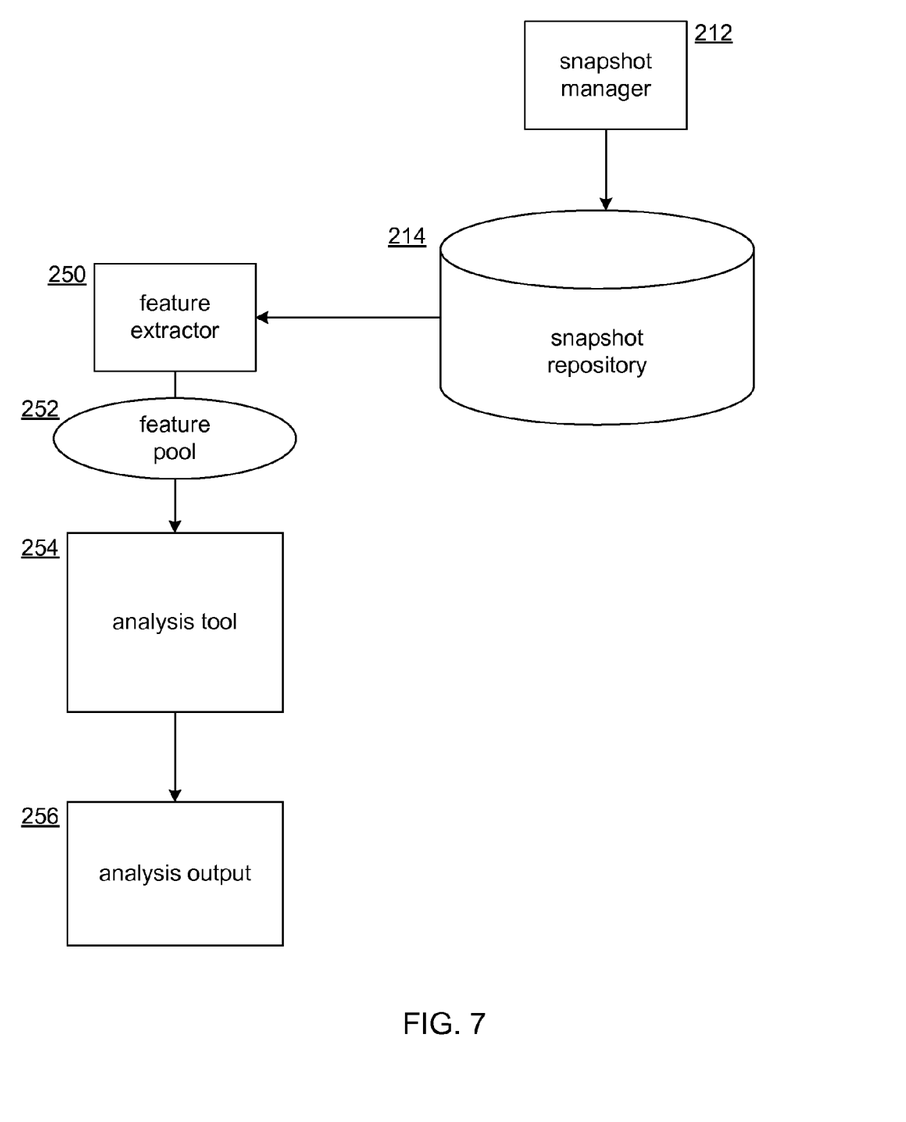
FIG. 7 shows a system for analyzing virtual machine snapshots.

FIG. 7 shows a system for analyzing virtual machine snapshots. The snapshot repository 214 stores virtual machine snapshots captured by one or more snapshotting components 184 of one or more virtual machines 114, possibly as instructed by the network-based snapshot manager 212. The virtual machine snapshots may be captured over time as a sequence of a single virtual machine 114, or may be a hierarchy 230 of one or more virtual machines, or a combination thereof. One skilled in the art of machine learning will appreciate that in embodiments where formal machine learning algorithms are used, it may be necessary to have a substantial number of snapshots that is sufficient for producing reliable results.

The snapshots are read by a feature extractor 250. A subset of the stored virtual machine snapshots may be selected or queried for according to a particular purpose of the analysis, the selection of analysis algorithm, and so forth. The feature extractor 250 accesses a virtual machine snapshot, mounts/reads the file system therein, reads the stored memory content, reads configuration (e.g., registry) settings, and/or reads metadata about the virtual machine included with the snapshot, to identify a set of pre-defined features of the snapshot. Any type of feature may be subject to extraction for analysis. The feature extractor 250 may have a template or definition file that defines the features to be sought and extracted, for example a set of files, a set of attributes of the virtual machine itself, a set of software packages to be checked for, etc. Feature extraction and example features are discussed in greater detail with reference to FIG. 8.

Returning to FIG. 7, the feature extractor 250 outputs a set of features for each virtual machine image in the form of a feature pool 252. The feature pool 252 associates features of the snapshots with the individual snapshots they were obtained from. The feature pool 252 allows the virtual machine snapshots to be analyzed as a group (e.g., for clustering analysis or other types of machine learning) by an analysis tool 254.

The analysis tool 254 receives the feature pool 252 and performs analysis on the feature pool 252. The analysis can take a wide range of forms. The analysis tool 254, running as software on one or more computers, may be programmed with custom logic such as a decision tree or a set of rules (obtained from a rule database) that are specific to a particular analysis to be performed (e.g., security, or performance, or a particular software bug). The analysis tool 254 may instead perform analysis using statistical modeling or machine learning techniques described below, where analytical conclusions are not from hard-coded logic but rather the meaning of features depends on training data and/or the feature pool 252 as a whole.

The analysis tool 254 outputs analysis output 256, which also may take a variety of forms. The purpose of automated snapshot analysis is to identify or estimate properties or traits of virtual machines that correspond to the snapshots being analyzed. As such, analysis output 256 may be a ranking of snapshots according to likelihood of a virtual machine having a defined condition (e.g., infected with a computer virus), or having a particular trait (e.g., will experience a failure in the next 8 days), or belongs to a particular category (e.g., underperforming machines) etc. Analysis output 256 may also, rather than analyzing snapshots relative to predefined semantic meaning, identify statistical traits of virtual machines, clusters of machines grouped by similarities, and others.

Figure 8:
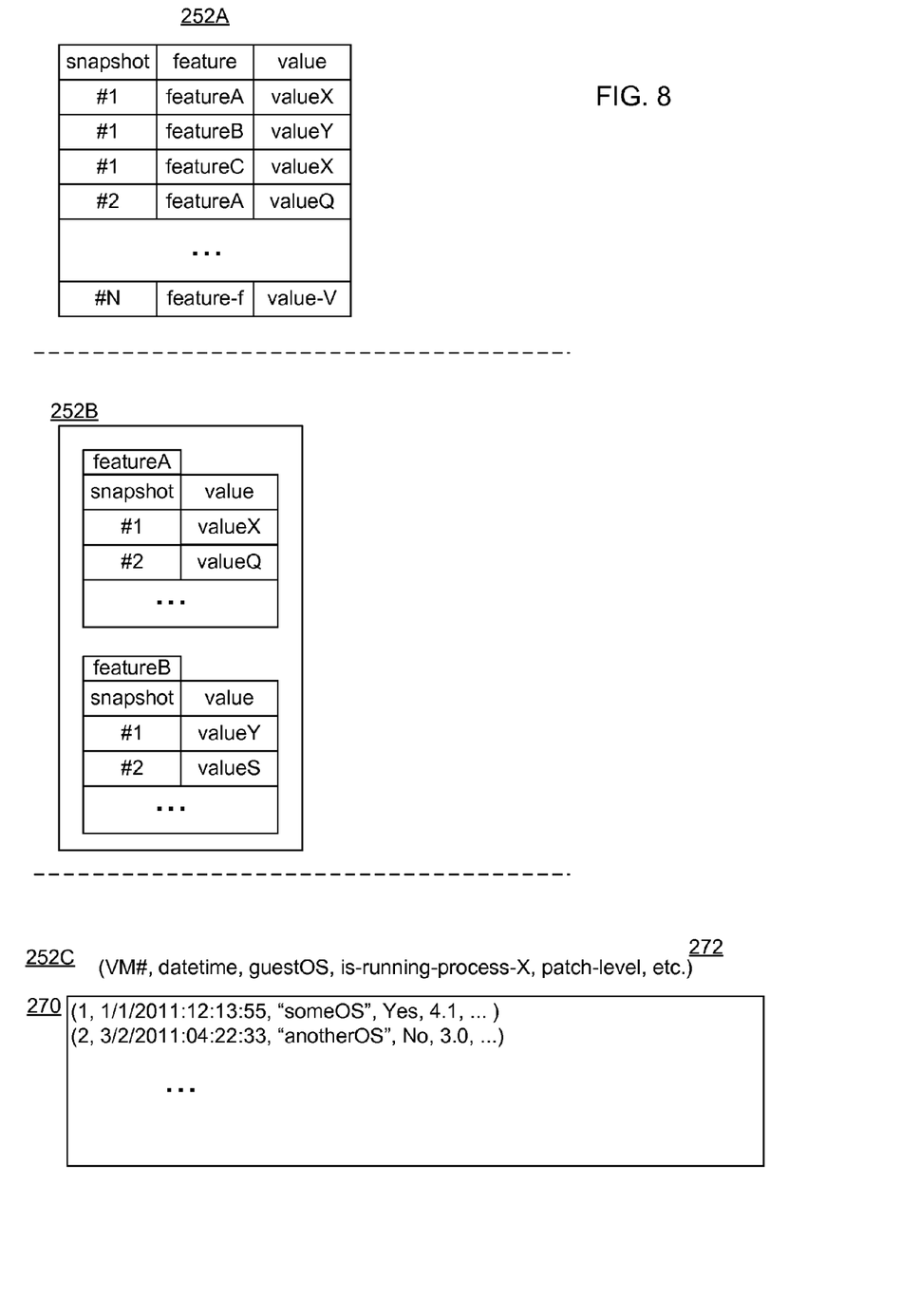
FIG. 8 shows example virtual machine snapshot feature pools.

FIG. 8 shows example virtual machine snapshot feature pools. Feature pool 252A is a set of triples of the form (snapshot#, feature, value); links to information about source virtual machines and/or snapshots are assumed, to allow results to be related to individual snapshots or virtual machines. Not only may a feature be a particular value extracted from a snapshot (e.g., a registry setting, a file name, a memory amount, a version number, etc.), a feature may also be a calculated value. For example, a feature might represent a number of files in a predefined set that exist in a snapshot, or a number of conditions found to be true (for example, 8 out of 10 virus conditions might have been found). Example feature pool 252B is another way of structuring the feature pool 252A.

Feature pool 252C is a set of feature vectors 270. Each feature vector is a set of values arranged in a predefined order, with each value at a position corresponding to a feature variable in a vector of feature variables 272. In some embodiments where machine learning is used, there is no need to explicitly define the feature variables. Again, the features in a feature vector are simply values derived from a snapshot, including its semantic content and/or metadata. For example, it is possible to read the stored copy of working memory in a snapshot and parse for objects such as names of open files, programmatic objects, or other objects that can be seen as having been active when the virtual machine was snapshotted.

Figure 9:
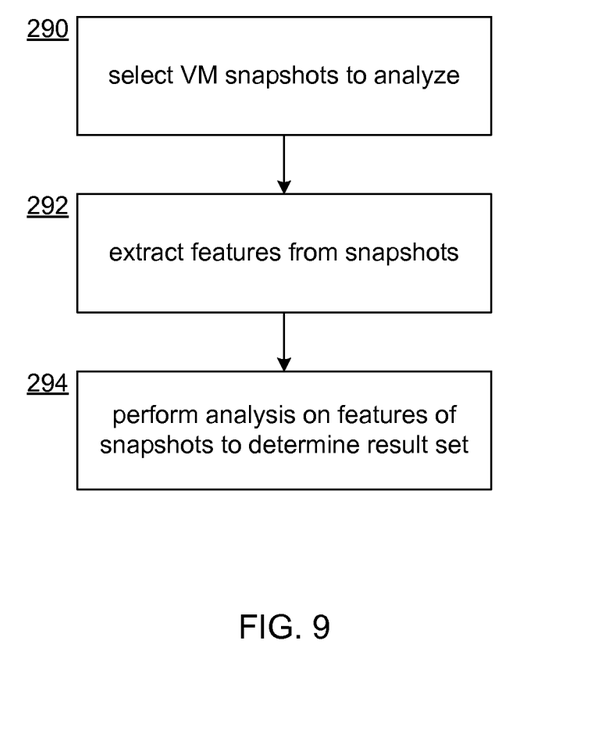
FIG. 9 shows a process for extracting and analyzing snapshot features.

FIG. 9 shows a process for extracting and analyzing snapshot features. First, at step 290, a set of virtual machine snapshots may be selected for feature extraction. As mentioned above, a defined range of time, virtual machine properties (e.g., tenant that owns a virtual machine), random sampling, or other conditions may be used to filter the snapshots. At step 292 features are extracted from the selected snapshots. The features may be selected from a specification specifying names or locations of features, etc. In one embodiment, the feature extraction may be supplemented by a dimensionality reduction process that reduces the feature space to be analyzed. For example, if values of a feature variable are found to be nearly uniform across the set of selected snapshots, the feature variable may not have analytical value and can be omitted. There are known techniques that may be used for selecting feature variables and/or reducing the number of dimensions in the feature space. At step 294 the analysis is performed on the feature pool. This may involve blind application of machine learning or artificial intelligence, custom statistical analysis logic, etc.

Figure 10:
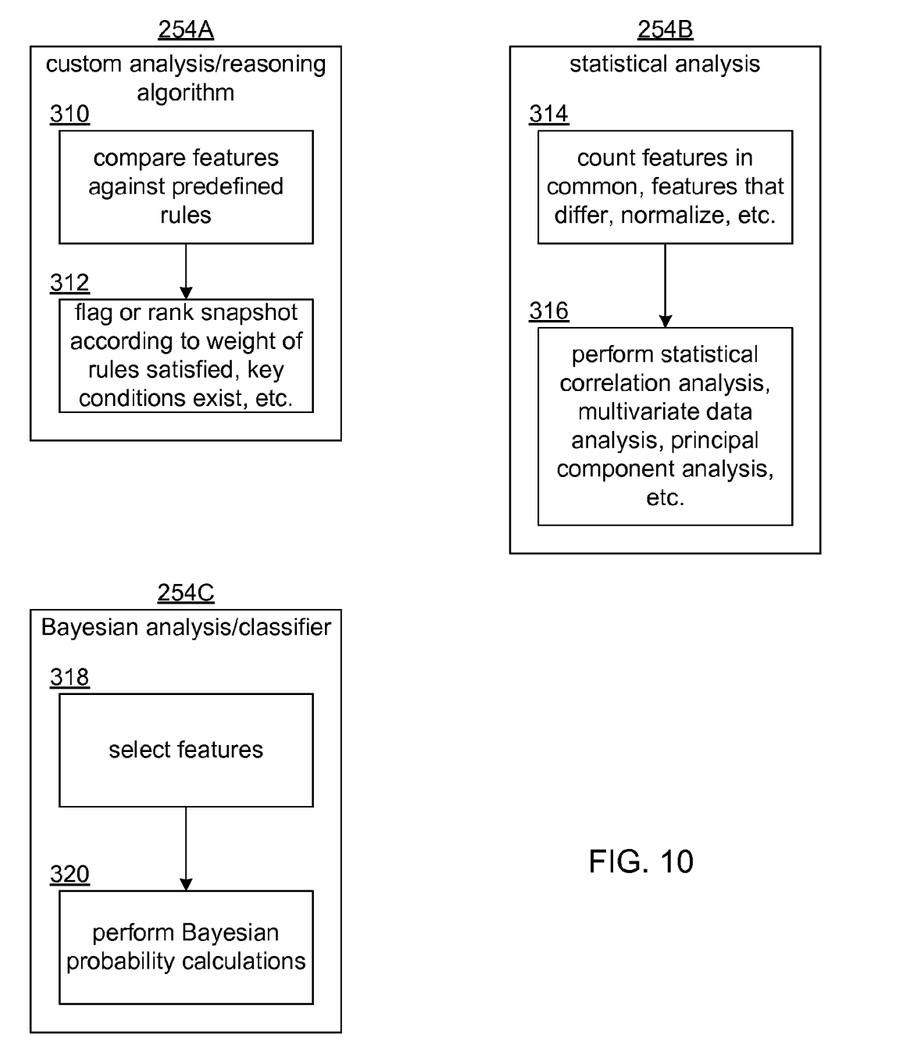
FIG. 10 shows example embodiments of the analysis tool.

FIG. 10 shows example embodiments of the analysis tool 254. An example custom analysis tool 254A performs a step 310 of comparing features (feature values) against a predefined set of rules or a decision tree, and step 312 outputs results by ranking virtual machine snapshots or flagging some snapshots as satisfying the logic or a sufficient number of conditions. An example statistical analysis tool 254B may apply known statistical analysis algorithms. At step 314 computations such as counts of features, standard deviations of values, average values, and so forth may be applied to known statistical algorithms to identify snapshots that are sufficiently similar, statistical stand-outs or anomalies, and so on. A Bayesian classifier analysis tool 254C applies Bayesian probability algorithms. Step 318 may select features for analysis (e.g., dimensionality reduction), and step 320 applies Bayesian probability calculations. The output may be ranks or probabilities of snapshots.

Figure 11:
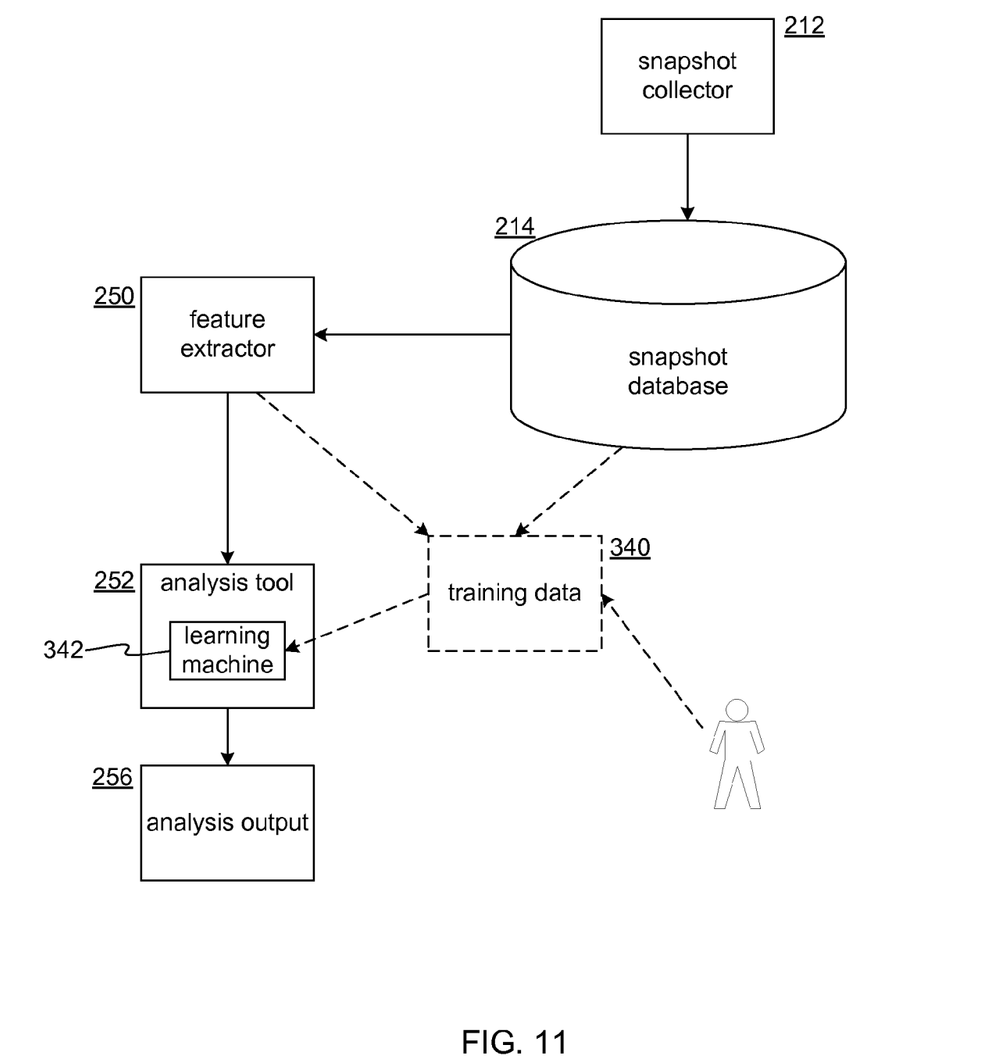
FIG. 11 shows a machine learning embodiment that uses training data.

FIG. 11 shows a machine learning embodiment that uses training data. A set of training data 340 is initially formed. The training data may be automatically or manually generated. As mentioned, training samples may be labeled according to information related to the capture of a snapshot, such as crash-prone virtual machines, geographic location, poorly performing virtual machines, reliable or well-performing machines, infected or non-infected machines, and so on. The training data 340 is passed to a learning machine 342. The learning machine 342 is then trained according to the training data 340, in effect forming a statistical model to be applied to samples. In one embodiment, the learning machine 342 may be a supervised learning machine such as a support-vector machine (SVM) for classifying samples. In another embodiment, no training data is used and an unsupervised learning algorithm (e.g., a neural network) is used for learning machine 342, which may summarize the sample snapshots, find salient features, etc.

Figure 12:
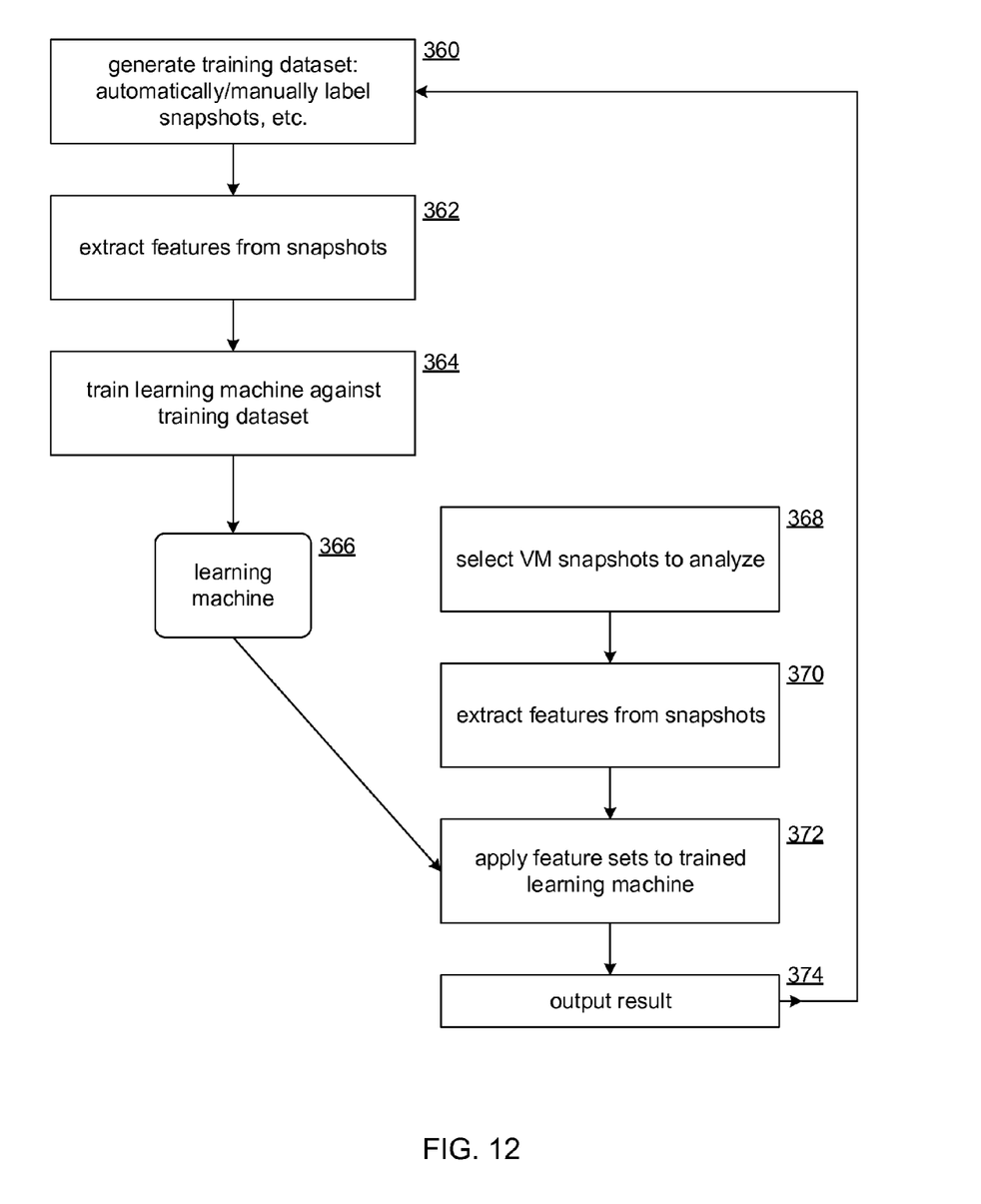
FIG. 12 shows a process for training and using a supervised or semi-supervised learning machine.

FIG. 12 shows a process for training and using a supervised or semi-supervised learning machine. At step 360 a training dataset is generated by automatically and/or manually labeling training snapshots. At step 362 features are extracted from the labeled snapshots; a feature vector may be given the label of the snapshot from which it was derived. At step 364 a learning machine 366 is trained by with the training dataset. Use of the learning machine 366 to analyze unlabeled snapshots begins at step 368, where the virtual machine snapshots to be analyzed are selected. At step 370, features are extracted in the form of feature vectors. At step 372 the feature vectors are passed to the trained learning machine 366, which outputs results at step 374. The results may be in the form of indications of likelihoods that a label for the respective sample snapshots is correct.

As noted earlier, many forms of machine learning may be used. Any type of linear classifier may be used. Semi-supervised learning algorithms may be used. As used herein "machine learning" will refer to any known or future artificial intelligence algorithms for automated learning, including, categorically: supervised learning algorithms (e.g., neural networks, Bayesian statistics, decision trees, learning automata, regression analysis, Gaussian process regression, inductive logic programming, etc); statistical classification algorithms (e.g., linear classifiers, k-nearest neighbor, boosting, Bayesian networks, hidden Markov models, etc.); unsupervised learning algorithms (e.g., data clustering, expectation-maximization, radial basis function network, etc.); associative learning (e.g., a-priori algorithms and FP-growth algorithms); hierarchical clustering algorithms; partial clustering algorithms; and/or others.

Because snapshots are taken from live running virtual machines, run-time state may be taken into account. In particular, features of a guest operating system may be used, including features related to memory, processes, threads, boot state, and other features that are not found in dormant physical computers (or images thereof), or information found in static files, log files, etc.

Conclusion

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method, comprising:
accessing stored virtual machine snapshots, the virtual machine snapshots having been captured from one or more executing virtual machines; and
automatically forming a pool of features comprised of features obtained from the accessed virtual machine snapshots; and
performing automated analysis on the pool of features to identify one or more traits of one or more of the virtual machine snapshots, wherein the automated analysis either:
computes probabilities that correspond to the one or more virtual machines, respectively;
categorizes one or more of the virtual machines into one or more pre-defined categories; or
ranks the one or more virtual machines relative to each other with respect to relevance to a predefined trait, wherein a rank of a virtual machine indicates its relative relevance to the predefined trait.

2. A method according to claim 1, wherein the automated analysis comprises a machine learning algorithm.

3. A method according to claim 2, wherein the automated analysis is performed using machine learning trained using a training dataset of features of training snapshots.

4. A method according to claim 1, wherein the virtual machine snapshots comprise snapshots taken at different times of a same virtual machine running at the different times.

5. A method according to claim 1, wherein the virtual machine snapshots having been captured from a hierarchy of virtual machines including parent virtual machines and child virtual machines, each child virtual machine having been produced by duplicating a corresponding parent virtual machine and then running with different state than the parent virtual machine.

6. One or more computer-readable storage media storing information to cause one or more computers to perform a process, the process comprising:
performing feature extraction on a plurality of concurrently stored virtual machine snapshots to obtain a set of feature values of features of the virtual machine snapshots, the virtual machine snapshots having been previously captured during execution of one or more virtual machines by capturing virtualized memory and virtualized disk data of the one or more virtual machines while the one or more virtual machines were online; and performing automated reasoning on the extracted feature values to rank, identify, classify, and/or compute probabilities of traits of the virtual machines that corresponds to the feature values of trait the virtual machine snapshots, wherein the automated analysis comprises either:

computing probabilities that correspond to the virtual machines, respectively;

categorizing one or more of the virtual machines into one or more pre-defined categories; or ranking the virtual machines relative to each other with respect to relevance to a predefined trait, wherein a rank of a virtual machine indicates its relative relevance to the predefined trait.

7. One or more computer-readable storage media according to claim 6, wherein, the feature extraction comprises forming feature vectors of the virtual machine snapshots, where each feature vector comprises feature values of a corresponding virtual machine snapshot, the feature values of each feature vector corresponding to a same set of feature variables that define a feature space.

8. One or more computer-readable storage media according to claim 7, the processing further comprising processing the feature vectors with a machine learning algorithm.

9. One or more computer-readable storage media according to claim 6, further comprising performing a dimension reduction algorithm that reduces a number of feature values of each feature vector passed to the machine learning algorithm.

10. One or more computer-readable storage media according to claim 6, wherein each virtual machine snapshot comprises a file system containing a guest operating system and a copy of memory as managed by a running kernel of a guest operating system.

11. One or more computer-readable storage media according to claim 10, the feature extraction comprising at least one or more of: identifying files in the file systems, obtaining feature values by reading the copies of memory, obtaining values of hardware resources of the virtual machines, obtaining configuration settings of the guest operating systems, and obtaining information about software installed on the virtual machines.

12. One or more computer-readable storage media according to claim 6, further comprising forming a training data set by labeling one or more of the feature vectors.

13. One or more computer-readable storage media according to claim 6, further comprising using the training data set to train a model or algorithm used to perform the automated reasoning.

14. One or more computer-readable storage media according to claim 6, further comprising storing, by the one or more computers, output about the virtual machines obtained by the reasoning.

15. A method for analyzing virtual machines, the method performed by one or more computers and comprising:

automatically periodically snapshotting each of the virtual machines as they are executing to form a pool of virtual machine snapshots, wherein the virtual machines remain online while being snapshotted, and wherein the pool of virtual machine snapshots comprises pluralities of periodically automatically captured snapshots of the respective virtual machines;

retaining the pool of virtual machine snapshots together in a snapshot repository;

reading the virtual machine snapshots in the snapshot repository to obtain therefrom a set of properties of the virtual machine snapshots;

storing the set of properties in a datastore; and automatically computing and storing information about the virtual machines based on the set of properties in the datastore, the information about the virtual machines obtained by statistical computation, based on the properties, by the one or more computers, the statistical computation comprising at least:

computing probabilities that correspond to the virtual machines, respectively;

categorizing the virtual machines into one or more pre-defined categories; or ranking the virtual machines relative to each other with respect to relevance to a predefined trait, wherein a rank of a virtual machine corresponds to its relative relevance to the predefined trait.

16. A method according to claim 15, wherein the information about the virtual machines comprises information identifying a subset of the virtual machines.

17. A method according to claim 15, further comprising identifying one or more groups of similar or dissimilar virtual machines according to the properties, or ranking the virtual machines according to the properties.

18. A method according to claim 15, wherein the properties comprises values of property variables, the method further comprising identifying one or more property variables as predictive of a pre-defined condition or trait of the virtual machines.

19. A method according to claim 15, further comprising obtaining the set of properties from pieces of metadata associated with the virtual machines, respectively, the metadata comprising information about geographic locations, or hardware resources, or configurations of the virtual machines.

* * * * *